(12) United States Patent
Cook

(10) Patent No.: US 12,008,472 B2
(45) Date of Patent: Jun. 11, 2024

(54) APPARATUS AND METHOD FOR GENERATING A COMPILED ARTIFICIAL INTELLIGENCE (AI) MODEL

(71) Applicant: David Cook, Lakeway, TX (US)

(72) Inventor: David Cook, Lakeway, TX (US)

(73) Assignee: David Cook, Lakeway, TX (US)

( * ) Notice: Subject to any disclaimer, the term of this patent is extended or adjusted under 35 U.S.C. 154(b) by 0 days.

(21) Appl. No.: 17/853,143

(22) Filed: Jun. 29, 2022

(65) Prior Publication Data

US 2024/0005145 A1   Jan. 4, 2024

(51) Int. Cl.
*G06N 3/08* (2023.01)

(52) U.S. Cl.
CPC .................... *G06N 3/08* (2013.01)

(58) Field of Classification Search
CPC .......... G06N 3/08; G06N 5/006; G06N 5/025; G06N 20/00
See application file for complete search history.

(56) References Cited

U.S. PATENT DOCUMENTS

| | | | | |
|---|---|---|---|---|
| 10,540,610 B1* | 1/2020 | Yang | ...................... | G06N 20/00 |
| 10,873,849 B1* | 12/2020 | Qiang | ................... | H04W 12/08 |
| 10,979,369 B1* | 4/2021 | Kulkarni | ................ | G06N 20/00 |
| 11,257,073 B2* | 2/2022 | Padmanabhan | ........... | H04L 9/50 |
| 11,610,205 B1* | 3/2023 | Fain | ...................... | G06Q 40/02 |
| 2019/0332921 A1 | 10/2019 | Rodriguez | | |
| 2020/0089650 A1* | 3/2020 | Sharma | ................ | G06K 9/6256 |
| 2020/0143267 A1 | 5/2020 | Gidney | | |
| 2020/0218940 A1 | 7/2020 | Anglin et al. | | |
| 2020/0251218 A1* | 8/2020 | Stoval, III | ............. | G06N 20/00 |
| 2021/0019631 A1 | 1/2021 | Das et al. | | |
| 2021/0192389 A1* | 6/2021 | Guan | ..................... | G06F 16/215 |
| 2021/0201236 A1* | 7/2021 | Makhija | .................. | G06F 16/27 |
| 2021/0248514 A1 | 8/2021 | Cella et al. | | |
| 2021/0264520 A1 | 8/2021 | Cummings | | |
| 2021/0334253 A1 | 10/2021 | Darji et al. | | |
| 2021/0377310 A1 | 12/2021 | Fernando et al. | | |
| 2021/0390466 A1 | 12/2021 | Varadarajan et al. | | |
| 2023/0113896 A1* | 4/2023 | Milazzo | ................. | G06N 20/00 713/164 |

FOREIGN PATENT DOCUMENTS

| | | | | |
|---|---|---|---|---|
| WO | 2021195689 | 10/2021 | | |
| WO | WO-2022100945 A1 * | 5/2022 | ......... | G06F 16/2455 |

OTHER PUBLICATIONS

Drungilas et al.; Title: Towards Blockchain-Based Federated Machine Learning: Smart Contract for Model Inference; Jan. 23, 2021.
Bouktif et al.; Title: Optimal Deep Learning LSTM Model for Electric Load Forecasting using Feature Selection and Genetic Algorithm: Comparison with Machine Learning Approaches, Jun. 22, 2018.

* cited by examiner

*Primary Examiner* — Benjamin P Geib
(74) *Attorney, Agent, or Firm* — Caldwell Intellectual Property Law

(57) ABSTRACT

An apparatus and method for generating a compiled artificial intelligence (AI) model. The apparatus incudes a processor that is configured to receive data sets from user devices. The processor is further configured to convert the data sets using a machine-learning model into a cleansed data format and generate an accumulated model using the converted data sets as training data.

18 Claims, 9 Drawing Sheets

APPARATUS AND METHOD FOR GENERATING A COMPILED ARTIFICIAL INTELLIGENCE (AI) MODEL

FIELD OF THE INVENTION

The present invention generally relates to the field of artificial intelligence. In particular, the present invention is directed to an apparatus and method for generating a compiled artificial intelligence (AI) model.

BACKGROUND

Artificial intelligence is often used for data processing. However, raw data may contain data related to different sectors and/or different types of data. There is a need to accurately and efficiently classify data to generate a compiled AI model.

SUMMARY OF THE DISCLOSURE

In an aspect, an apparatus for generating a compiled artificial intelligence (AI) model, the apparatus including a processor and instructions configuring the a processor to receive data sets from user devices, convert the data sets using a machine-learning model into a cleansed data format, and generate an accumulated model using the converted data sets as training data.

In another aspect, method for generating a compiled artificial intelligence (AI) model includes receiving, by a processor, data sets from user devices, converting, by the processor, the data sets using a machine-learning model into a cleansed data format, and generating, by the processor, an accumulated model using the converted data sets as training data These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
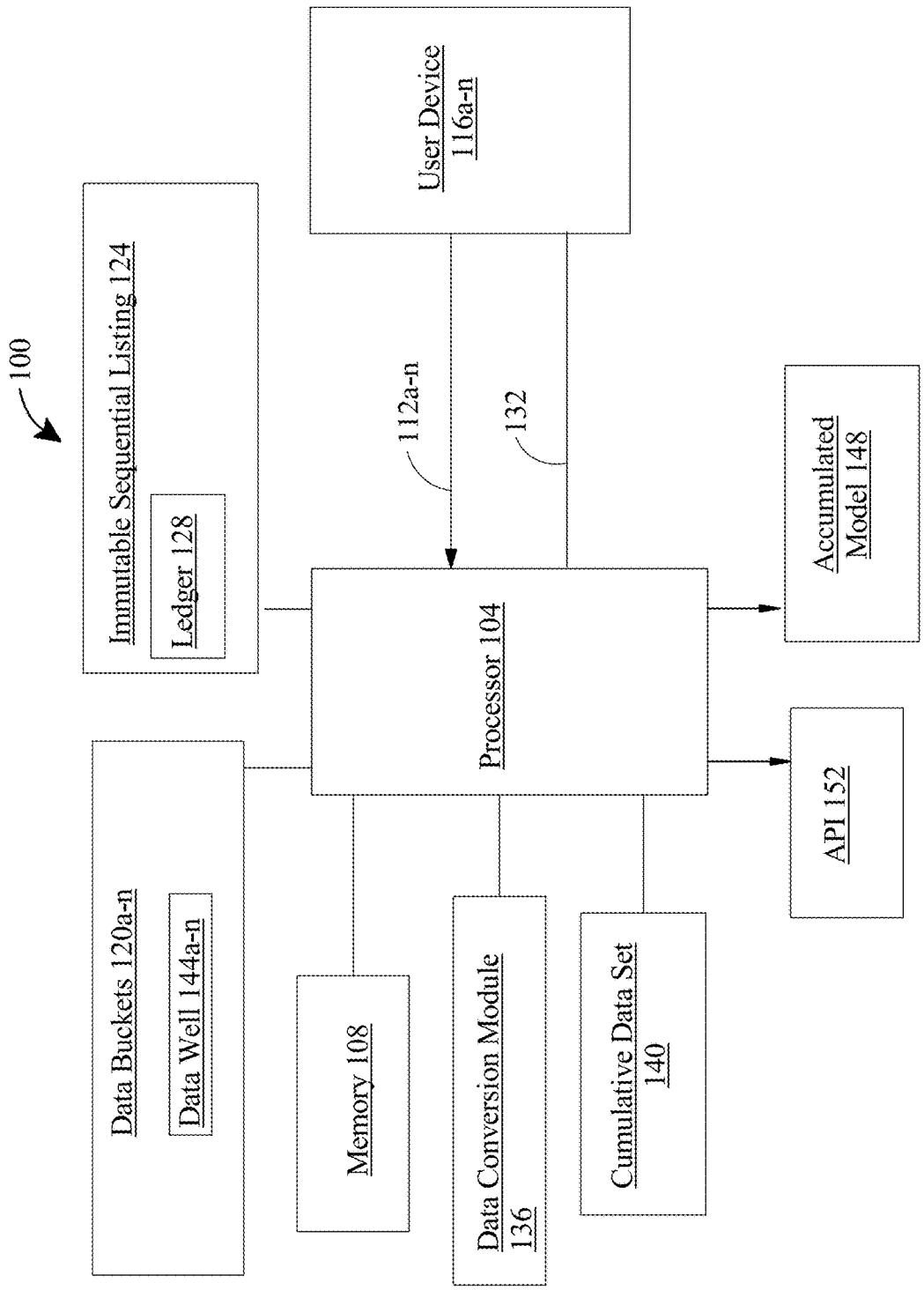
FIG. 1 is a block diagram illustrating an exemplary embodiment of an apparatus for generating a compiled artificial intelligence (AI) model in accordance with one or more embodiments of the present disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for processing data sets and generating a compiled artificial intelligence (AI) model. In various embodiments, more robust compiled artificial intelligence models may be generated. In some cases, multiple entities can provide their own data sets for the AI model to be generated. In some embodiments, the sources of these data sets can be verified.

Aspects of the present disclosure allow for received data sets to be efficiently processed and categorized for use in generating a compiled artificial intelligence model. Aspects of the present disclosure quantification may then be awarded to the source as a function of the contribution to the compiled model. Exemplary embodiments illustrating aspects of the present disclosure are described below in the context of several specific examples.

In an embodiment, methods and apparatuses described herein may perform implement one or more aspects of a cryptographic system. In one embodiment, a cryptographic system is a system that converts data from a first form, known as "plaintext," which is intelligible when viewed in its intended format, into a second form, known as "cyphertext," which is not intelligible when viewed in the same way. Cyphertext may be unintelligible in any format unless first converted back to plaintext. In one embodiment, a process of converting plaintext into cyphertext is known as "encryption." Encryption may involve the use of a datum, known as an "encryption key," to alter plaintext. Cryptographic system may also convert cyphertext back into plaintext, which is a process known as "decryption." Decryption process may involve the use of a datum, known as a "decryption key," to return the cyphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. A further example of an asymmetric cryptographic system may include a discrete-logarithm based system based upon the relative ease of computing exponents mod a large integer, and the computational infeasibility of determining the discrete logarithm of resulting numbers absent previous knowledge of the exponentiations; an example of such a system may include Diffie-Hellman key exchange and/or public key encryption. Another example is elliptic curve cryptography, which relies on the fact that given two points P and Q on an elliptic curve over a finite field, a definition of the inverse of a point –A as the point with negative y-coordinates, and a definition for addition where A+B=–R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments of apparatus and methods described herein may generate, evaluate, and/or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described in further detail below, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for generating a compiled artificial intelligence (AI) model is illustrated. Apparatus includes a processor 104 and a memory 108 communicatively connected to processor 104, wherein memory 108 contains instructions configuring processor 104 to carry out the processing and generating process. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting an output of one device, component, or circuit to an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, processor 104 and/or computing device may be designed and/or configured by memory 108 to perform any method, method step, or sequence of method steps in any embodiment described in this disclosure, in any order and with any degree of repetition. For instance, processor 104 and/or computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Processor 104 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor 104 may further comprise and/or be included in a server. A server may include a computing device and/or computing devices that provides functionality for other programs or devices. A server may provide various functionalities such as sharing data or resources and performing computation among multiple other programs and or devices. Servers may include database servers, file servers, mail servers, print servers, web servers, and/or application servers. In an embodiment, the server may communicate with a digital wallet through a communication network. A communication network may include a network interface card (e.g., a mobile network interface card, a LAN card), a modem, and any combination thereof. A communication network may also include a wide area network (e.g., the Internet, an enterprise network), a local area network (e.g., a network associated with an office, a building, a campus or other relatively small geographic space), a telephone network, a data network associated with a telephone/voice provider (e.g., a mobile communication provider data and/or voice network), a direct connection between two computing devices, and any combination thereof. A communication network may employ a wired and/or wireless mode of communication. In general, any network topology may be used. Information may be communicated to and/or from digital wallet through a communication network. In a non-limiting example, processor 104 may include security protections against software or software and hardware attacks, including without limitation attack scenarios in which a malicious actor may attempt to extract cryptographic keys for purpose of spoofing the key, the modify computer code, data or memory structures or similar; such protections may include, without limitation, a secure computing module or elements thereof as disclosed in further detail below. Processor 104 may also include public/private key pairs or other cryptographic key pairs, including without limitation symmetric public keys, elliptic curve based, keys, asymmetric public keys, and the like, or mechanisms to create them, for purposes of cryptographically authenticating the validity of processor 104 to another device, authenticating the validity of secure software loaded onto the device, or other data, including without limitation inputs, outputs, time of loading, and/or time of execution of software, boot sessions, or the like.

Still referring to FIG. 1, processor 104 is configured to receive a data set 112*a-n* from user devices 116*a-n*. A "user device," for the purpose of this disclosure, is any additional computing device, such as a mobile device, laptop, desktop computer, or the like. In a non-limiting embodiment, user device 116*a-n* may be a computer and/or smart phone operated by a user in a remote location. User device 116*a-n* may include, without limitation, a display in communication with apparatus 100; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device 116*a-n* may include a graphical user interface (GUI) configured to display any information from apparatus 100 and/or any computing device. The a data set 112*a-n* may be an input into the apparatus 100. The a data set 112*a-n* may include a first data set 112*a*. As used in this disclosure, an "data set" is a collection of data and/or information. The a data set 112*a-n* may include information a user has gathered to be analyzed, compiled, sorted, and the like. Further, the a data set 112*a-n* may include any file including tables, graphs, charts, rows of data, columns of data, headers for data, and the like.

Continuing to reference FIG. 1, the a data set 112*a-n* may also include a second data set 112*b*. The second data set may include any data set. For example, the second data set may include the first data set. In an embodiment, the second data set may include data with headers that are identical to headers within the first data set. In a further embodiment, the second data set may be distinct from the first data set. The processor 104 may be configured to receive the second data set from a second user device 116*b* of the user devices 116*a-n*. In an embodiment, the second user device 116*b* may be the first user device 116*a*. According to another embodiment, the second user device 116*b* may be a different user device of the user devices 116*a-n*. Additionally, the processor 104 may be configured to receive additional data sets from other user devices of the user devices 116a-n. The user devices 116a-n may be nodes on a network, such as a peer-to-peer network. For example, the processer may be configured to receive a third data set from a third user device 116c, and the like. Each data received by the processor 104 may be posted on an immutable sequential listing, as described below. Further, each data set of the a data set may include meta data describing a data bucket associated with the data set. The data bucket may be a data bucket of data buckets 120a-n stored by the processor. As used in this disclosure, a "data bucket" 120a-n is a collection of data for processing by the processor that is organized based on a category of the data within a data set. The data bucket may be a categorization of the data type contained within the data set. The data bucket 120a-n may be any category of data that may be analyzed. For example, the data bucket may include one of fracking data, well survey data, drilling data, MRI data, production data, crypto currency market data, and the like.

The a data set 112a-n may be posted on an immutable sequential listing 124. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing 124 may be, include and/or implement a ledger 128, where data entries that have been posted to the immutable sequential listing 124 cannot be altered. An immutable sequential listing may include a directed acyclic graph. As used in this disclosure, a "ledger" is a digital immutable ledger where data entries may be posted and cannot be altered. Ledger 128 may be distributed across some or all nodes 116a-n on network 132, such as a peer-to-peer network, whereby each node 112a-n replicates and saves an identical copy of ledger 128 and updates itself independently. A common example of an immutable sequential listing 124 is a blockchain. System 100 may include embodiments of an immutable sequential listing 124 discussed below in reference to FIG. 2. Immutable sequential listing 124 may include multiple immutable sequential listings. Immutable sequential listing 124 may include shared and synchronized digital data which may be spread across multiple sites. Immutable sequential listing 124 may be stored and/or implemented on two or more nodes 116a-n that may be connected by network 132, such as on a peer-to-peer network. Node 112a-n may include a device such as computing device 104, any remote device, or the like. Nodes 116a-n may be connected by network 132 and share information through ledger 128 that is distributed. There may be no central administrator or centralized data storage of information and/or data located on immutable sequential listing 124. As information is entered onto and updated on ledger 128 shared by nodes 116a-n on network 132, each node 112a-n may construct a new transaction. Nodes 112a-n a-n may then vote by a consensus algorithm as to which copy is correct. Consensus algorithms may include proof of work, proof of stake, or voting systems. Once a consensus has been determined, all other nodes 112a-n may update themselves to reflect the new copy of ledger 128. In some embodiments, nodes 116a-n may copy ledger 128 in its entirety. In other embodiments, nodes 116a-n may copy one or more portions of ledger 128. Nodes 116a-n may be connected through a peer-to-peer networking whereby nodes 116a-n are equally privileged and equipotent participants. A peer-to-peer network may include a network of nodes 116a-n that may make a portion of their resources available to other network 108 participants. This may include resources such as processing power, disk storage or network bandwidth. Nodes 116a-n located on a peer-to-peer network may both supply and consume resources. System 100 may utilize cryptographic keys and digital signatures to ensure node security and/or authenticity. System 100 may utilize digitally signed assertions as described in more detail below in reference to FIG. 2. The first data set may be received from a first user device 116a-n of user devices 116a-n in communication with the processor 104.

In one or more embodiments, an immutable sequential listing 124 may include blocks containing entries of data. For example, and without limitation, a data set 112a-n may have blocks representing data set entry and the like. Entries of data may also comprise of records of transactions, such as Bitcoin transactions, or other payment transactions. Additionally, entries of data may comprise of files, such as JPEGs, documents, spreadsheets, videos, pictures, etc. Blocks of immutable sequential listing 124 may be hashed and encoded into a Merkle tree. In an embodiment, each block includes a cryptographic hash of the prior block, linking the blocks and creating a chain. The top of the Merkle tree may comprise a Merkle root that may include a cryptographic accumulator 300. Immutable sequential listing 124 may include a cryptographic accumulator 300, which is discussed in further detail in FIG. 3. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or non-membership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set.

Still referring to FIG. 1, processor 104 may implement one or more algorithms or generate one or more machine-learning modules, such as data conversion module 136, to convert the a data set. In one or more embodiments, the machine-learning module may be generated using training data. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user such as a prospective employee, and/or an employer. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Data conversion module 136 may be generated using training data. Data conversion module 136 may be trained by correlated inputs and outputs of training data. Inputs of training data may include data sets. Outputs of training data may include conversion, compiling, analyzing, and the like corresponding to the inputs. Training data may be data sets that have already been converted whether manually, by machine, or any other method. Training data may include previous outputs such that data conversion module 136 iteratively produces outputs. Data conversion module 136 using a machine-learning process may output converted data based on input of training data.

In some embodiments, data conversion module 136 may be trained using data modified by a user associated with a user device 116a-n. That is, a user may generate data flags or identifying (ID) tags. For example, data may be recorded over days with a first set being recorded at surface and second set being recorded downhole. The downhole gauge will be at different pressures and temperatures compared to the surface gauge, and the internal clock will consequently drift. If data is only adjusted at the start of data recordation, then the end of the data may be out of sync. To remedy this, a user may drop one or more shift flags and contract and dilate time as needed to fully correct the data. The one or more shift flags may serve as a data correction to produce a more effective training data set for data conversion module 136. Moreover, training data used to train data conversion module 136 may be include key value links that enable combination of data sets of different types. In some embodiments, training data may link datasets of varying dimensions.

With continued reference to FIG. 1, processor 104 may be configured to convert the a data set 112a-n using a machine-learning module, such as data conversion module 136, into a cleansed data format. As used in this disclosure, a "cleansed data format" is a format and/or structure for data where the data is transformed from an unprocessed format and/or structure into a processed format and/or structure that is prepared for use in the generation and training of an artificial intelligence (AI) model, for example a machine learning model, a neural network, and the like. A cleansed data format may be used to ensure data used for the generating and training of the AI model is relevant and accurate to generate an optimal AI model. A cleansed data format may also include data that is transformed by constructive transformation, destructive transformation, and/or structural transformation into the process format and/or structure. In some embodiments, constructive transformation of data may include adding data, replicating data, and the like. In some embodiments, destructive transformation of data may include fixing or removing incorrect, corrupted, incorrectly formatted, duplicate, or incomplete data within a dataset, and the like. In some embodiments, structural transformation of data may include moving and/or combining columns of data in a data set, and the like. The converting of data may include the processing, cleansing, standardizing, and categorizing of data into a cleansed data format for use in generating an accumulated artificial intelligence (AI) model. In an embodiment, the converting of the a data set 112a-n may include the processing, cleansing, and standardizing of data into a data set and/or data bucket for use in generating an artificial intelligence model. Data conversion module 136 may include using a classification algorithm, further explained below. The processor 104 may be configured to convert the a data set 112a-n based on the data bucket 120a associated with the data set 112a. The converting of the a data set 112a-n may include parsing each data set of the data sets and each header of headers of the data sets into parsed data. As used in this disclosure, a "header" is a part of a data set that carries metadata or other information necessary for processing the main data. In an exemplary embodiment, the header may be used describes the length of the content or other characteristics of the file. For example, data conversion module 136 may be configured to determine each header of data within each received data set and determine which data is associated with each respective header. In an embodiment, the data conversion module 136 may be configured to automatically determine a header based on a recognized header from a previous data set. In one exemplary embodiment, the data conversion module 136 may be configured to determine one header of the one data set 112a-n may be similar to a recognized header from a previous data set.

In some embodiments, data conversion module 136 may be configured to apply context to a header. For example, a process may involve a gellant. As used in this disclosure, a "gellant" is something that turns water into gel. There may be different kinds of gels and different chemicals that turn different gels back into water. Continuing the non-limiting example from above one or more ID tags may be added to a header so that specific rheological information may be programmatically added to the header. For instance, a gel type may be Guar, then a viscosity of 14 cp may be calculated by analyzing the gel loading and water rate. Essentially, a new column of data that contains information derived from outside of the data may be generated.

In an embodiment, the processer 104 may be further configured to use data conversion module 136 to determine a particular data bucket 120a-n associated with the parsed data. As described above, the data bucket 120 may be any category of data that may be used for analysis, plotting, modeling, and the like. Data conversion module 136 may include using a classification algorithm, further explained below.

Continuing to refer to FIG. 1, the converting of the a data set 112a-n may also including correcting the parsed data. The correcting of the parsed data may include determining a selected unit of measurement for the data based on an initial unit of measurement of the data and calculating an adjusted value for the data based on the selected unit of measurement. The calculating of the adjusted may be configured to provide standardized data for the converting and processing of data. Further, the converting of the data may also include determining whether the parsed data is irregular, and omitting the parsed data based on the determination the parsed data is irregular. As used in this disclosure, "irregular data" is data within a data set that is missing entries and/or data entries that include unexpected or inaccurate values. Additionally or alternatively, the converting of the a data set 112*a-n* may also include relabeling parsed data based on the data within the parsed data.

Still referring to FIG. 1, the converting of the a data set 112*a-n* may also include compiling each data set of the data sets into a cumulative data set 140 as a function of the converting of the a data set 112*a-n*. As used in this disclosure, a "cumulative data set" is a compilation of data sets that are compiled into a single data set. For example, in an example, the cumulative data set 140 may be compiled from one of the converted a data set, the parsed data, the corrected parsed data, and the like. In an embodiment, the cumulative data set 140 may include canonical categories of data. As used in this disclosure, "canonical categories of data," are standardized columns or categories of data into which data entries from the received a data set may be classified and input. In an embodiment, the processor 104 may be configured to generate the cumulative data set 140 using a canonical data set template with the canonical categories of data. For example, the canonical data set template may be a standardized data set template for a larger data set. Further, the canonical data set template may include canonical headers that may be used by the processer 104 for data entry into the template.

In one or more embodiments, the processor 104 may be configured to use data conversion module 136 to modify the canonical data set template. Additionally or alternatively, the processor 104 may be configured to use data conversion module 136 to modify the canonical data set template based on the received a data set 112*a-n* received by the processor 104. The canonical data set template may be modified to more closely match to the data of the received a data set 112*a-n*. For example, the received a data set 112*a-n* may include a header that may not be a header in the canonical data template and the machine learning model may be configured to recognize this and create a new header in the canonical data template. In an embodiment, the processor 104 may be configured to use artificial intelligence and/or a machine learning generate the canonical data template. Additionally or alternatively, the processor 104 may be configured to use data conversion module 136 to generate the canonical data set template based on the received a data set 112*a-n* received by the processor 104. For example, the processor 104 may be configured to create a canonical data set template and create new headers based on headers from the data from the received a data set 112*a-n*.

With continued reference to FIG. 1, the compiling each data set of the data sets into a cumulative data set 140 may include classifying the parsed data from the data sets into the canonical categories of data. In one or more embodiments, parsed data may be classified using data conversion module 136. Data conversion module 136 may use a classifier to classify parsed data. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. In an embodiment, processer may use a data classifier. In an embodiment, processor 104 may classify parsed into canonical categories of data in the cumulative data set 140. A classifier may be configured to output a datum that labels or otherwise identifies a set of data that are clustered together, found to be close under a distance metric as described below, or the like. Processor 104 and/or another device may generate a classifier using a classification algorithm, defined as a processes whereby a processor 104 derives a classifier from training data. In an embodiment, training data may be made up of training examples that each include examples of data to be inputted into the machine-learning module 120, such as a data set from user devices 116*a-n*, and examples of data to be output therefrom, such as compiled data sets. Training data may be implemented in any manner discussed below. Training data may be obtained from and/or in the form of previous data set categorization. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In other embodiments, data may be inputted into fuzzy inferencing system, where membership in fuzzy sets is determined by the parsed data. Outputs may be created by defuzzification of membership in one or more compensation level fuzzy sets and/or by mapping to a Takagi-Sugeno-Kang (TSK) function, which may be tuned using a supervised machine-learning process, as discussed further below in this disclosure.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Continuing to reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent. In some embodiments, neural network, for example neural networks as taught in reference to FIGS. 5-7, may be trained as a classifier. For instance and without limitation, neural network may be trained with training data correlating parsed data from the data sets into the categories of data for the compiled data set.

Still referring to FIG. 1, the compiling each data set of the data sets into a cumulative data set 140 may include inputting the parsed data into the canonical categories of data based on the classification of the parsed data. For example, the processor 104 may be configured to match the parsed data to a one of the canonical categories of data and input the parsed data into the canonical category matched to the parsed data to create a cumulative data set 140. In an embodiment, the processor 104 may be further configured to input the parsed data from the data sets into a data set template with canonical headers based on the classification of the parsed data to create a cumulative data set 140. In an example, the processor 104 may also be configured to match parsed data from each data set received by the processor 104 as a function of a data hook and input the parsed data into the canonical category matched to the parsed data to generate the cumulative data set 140. As used in this disclosure, a "data hook" is one data point that may be used to connect and/or interrelate data between different data sets of the data sets 112a-n.

In some instances, a data hook may not be a simple mapping process. As such, it may be advantageous to reformat certain data sets in a way that they can be related to other data sets using a data hook. For example, fracking may be time series based, drilling may be depth based and time based, but the time component of drilling has little correlation to fracking. Fracking may occur only at certain depths. Thus, a composite drilling file from time based drilling data may be generated. Additionally, a well may be divided into sub units (0.1 meter, 0.2 meter) intervals. Then, all of the time data from the drilling records may be aggregated and binned into the subunit intervals, and finally average those values out so that a composite view of the rock at that depth is generated.

In some embodiments, the fracking depth and corresponding drilling composite data bucket are selected. The selected data is then placed appended as a new data column in the fracking data. Additionally, or alternatively, an algorithmic analysis of a rock may be utilized. For example, everything within 10 meters of a reference point may utilized and extrapolated out for greater depths.

With further reference to FIG. 1, converting the data sets using a machine-learning model may include training the machine-learning model using a data category training set. In some embodiments, the machine-learning model may be a classifier. The machine learning model may be configured to determine a data bucket 120a-n for each data set based on data within each respective data set. As described above, a "data bucket" 120a-n is a collection of data for processing by the processor that is collected based on a category of the data within a data set. Further, the data bucket 120a-n may be associated with any category of data that may be used for analysis, plotting, modeling, and the like. As used in this disclosure, "data bucket training data" is a training data that correlates of data set and data headers to a data bucket 120a-n. For example, the machine-learning model may be trained to recognize if a first data set is related to fracking, a second data set is related to refining oil, and the like. Additionally, the determining of a data bucket 120a-n for each data set based on data within each respective data set may further include dividing each data bucket into a data well 144a-n for each data bucket 120a-n of the data sets. Further, the processer may be configured to place the received a data set 112a-n into one data well 144 of the a data bucket. In another embodiment, the processor may be configured to use a second machine-learning model to classify the bucket and the contents of each respective data well within each data bucket. For example, data sets in a data well relating to fracking may be further classified into data subwells related to pressure, and the like. The converting the data sets using a machine-learning model may also include, for example, pivoting data points, merging data sets, and the like thereof.

Continuing to reference to FIG. 1, the processor 104 may also be configured to identify data wells 144 for each data set. According to an embodiment, each data well 144*a-n* may include a well data model. Each well data model may be uniquely configured to based on the data set for the data well. For example, a well data model for fracking data may be distinct from a data well model for crypto currency market data. The processor 104 may be configured to train each well data using the received a data set 112*a-n* as training data. Additionally and/or alternatively, a user associated with a user device of the user devices 116*a-n* may select a well to train the a data set 112*a-n* received by the processor 104.

Still referring to FIG. 1, the processor 104 may be configured to generate an accumulated model 148 using the converted data sets as training data. As used in this disclosure, an "accumulated model" is an artificial intelligence (AI) model generated based on data sets received by the processor 104. As used in this disclosure, an "artificial intelligence (AI) model" is a program or algorithm that utilizes a set of data to recognize certain patterns. Further, the AI model may be configured to reach a conclusion or make a prediction when provided with sufficient information. The accumulated model 148 may be generated as a function of the converted data sets using a machine learning module, discussed in further detail in FIG. 4. In an embodiment, the accumulated model may be a machine-learning model and/or a neural network, discussed in further detail in FIGS. 4 and 5, respectively.

Further, accumulated model 148 may be generated as a function of static and/or dynamic data received from at least a data well 144*a-n*. In some embodiments, accumulated model 148 may be generated by static data. As used in this disclosure, "static data" is historical data for similar or the same process. For example, a fluid pump rate may be missing for generation of the accumulated model 148. However, fluid pump rates for a number of similar jobs may be available. As such, at least a fluid pump rate for the number of similar jobs may be used to determine a synthetic rate. As used in this disclosure, "synthetic rate" is a rate that is generated using mathematical operations rather than measured in real time. Keeping that in mind, the missing fluid pump rate may be substantiated using a synthetic rate; resulting in generation of accumulated model 148.

Moreover, generating accumulated model 148 as a function of dynamic data received from at least a data well 144*a-n*. As used in this disclosure, "dynamic data" may be real time data taken from at least a data well 144*a-n*. For example, accumulated model 148 may be generated in a "live mode" where each data feed used to train accumulated model 148 is tracked and used to update accumulated model 148 in view of any changes to each data feed, respectively.

With continued reference to FIG. 1, the processor 104 may be configured to verify each received a data set 112*a-n* as an entry in the immutable sequential listing 124. The processor 104 may be configured to verify each of the a data set 112*a-n* using a Merkle proof. The Merkle proof may validate the data within its respective Merkle tree, thereby providing validity of the data set 112 and its data to the apparatus 100. According to an embodiment, the processor 104 may be configured to generate the accumulated model 148 using the verified a data set 112*a-n*. The accumulated model 148 may be generated as a function of the converted data sets, the received a data set 112*a-n*, and the like. The processor 104 may be configured to merge, compile, sort, or the like thereof, converted data sets, cumulative data sets 140, the received a data set 112*a-n* to generate the accumulated model 148. According to an embodiment, the accumulated model 148 can be consistent with a data well to be trained by additional data sets to make the accumulated model 148 more robust.

In addition, the processor 104 may be configured to generate the accumulated model 148 in real time as a function of a connection to an application programming interface (API). The computing device may transmit the accumulated model 148 into a public domain dictated by the connection to the API. For example, one or more API data streams used to generate accumulated model 148 may be synchronized. As in, each API data stream of the one or more API data streams may need to be corrected (i.e., offset) if there is a lag of some sort. Additionally, a user may assign units to each API data stream. It should be noted that processor 104 may modify assigned units when generating accumulated model 148.

Continuing to reference to FIG. 1, the processor 104 may be configured to connect to the application programming interface (API) 152. The API may also be connected to each user device of the user devices 116*a-n* by a network. According to an embodiment, the API 152 can include connecting to an API live stream. The API 152 may allow a user to select one of a plurality accumulated models to be executed on a data set.

Still referring to FIG. 1, the processor 104 may be configured to generate a serial identifier for each data set of the a data set 112*a-n*. As used in this disclosure, "serial identifier" is a unique, non-changing alphanumeric set of characters of any length for each data set of the a data set 112*a-n* received by the processor 104. The serial identifier may include entries to be verified on the immutable sequential listing. For example, the serial identifier may include transaction and/or block entries that may be verified on the immutable sequential listing. For example, an immutable sequential listing may be able to verify a source of each data set used to generate an accumulated model. Each of the data sets used may be an entry on the immutable sequential listing. In an embodiment, entries can be verified by a quorum of participants, nodes, or the like thereof, as described above. For example, the entries can be verified by a quorum of each user device of the user devices 116*a-n* that provided each data set of the a data set 112*a-n*.

With continued reference to FIG. 1, the processor 104 may be configured to generate a smart contract associated with the accumulated model and each data set of the a data set 112*a-n* and a respective source of each data set. In an embodiment, each time the accumulated model 148 is selected and used, a smart contract may facilitate a payment to each respective source of data state used to generate the accumulated model. A "smart contract," as used in this disclosure, is an algorithm, data structure, program, and/or a transaction protocol which automatically executes, controls, documents, and/or records legally relevant events and actions according to the terms of a contract or an agreement. The smart contract may include requirements, terms, rules, conditions, or the like thereof, dictating an upstream royalty payment to the source of each data set. Objectives of smart contracts may include reduction of need in trusted intermediators, arbitrations and enforcement costs, fraud losses, as well as the reduction of malicious and accidental exceptions. In a non-limiting embodiment, computing device 200 may generate a smart contract based on resource condition 212 to be verified and/or validated via immutable sequential listing 220 by user 104, resource-backed entity 204, and/or any minimum number of nodes associated with immutable sequential listing 220. In another non-limiting embodiment, computing device 200 may generate security token entry 228 containing a smart contract denoted by conditional trigger 232. A "conditional trigger," as used in this disclosure, is an occurrence and/or condition which, once are met, deploys an update involving a token entry on immutable sequential listing 220. In some non-limiting embodiments, conditional trigger 232 may include a smart contract. In a non-limiting embodiment, each token entry and its associated smart contract can contain conditional triggers. In some non-limiting embodiments, a conditional trigger may include elements defining conditions, rules and/or terms to be met to enable a smart contract to deploy any token entry on immutable sequential listing 220. For instance, for each token to be recognized and added on immutable sequential listing 220, a conditional trigger of a smart contract may include a requirement that a user returns a minimum capital amount and a borrowed cryptographic resource back to a resource-backed entity. Another example of a conditional trigger may include a condition that the borrowed cryptographic resource is returned at an expiration of a specific time period. Person of ordinary skill in the art, upon reviewing the entirety of this disclosure, will be aware of the various embodiments of conditional triggers in the context of satisfying a smart contract for purposes as described herein.

Figure 2:
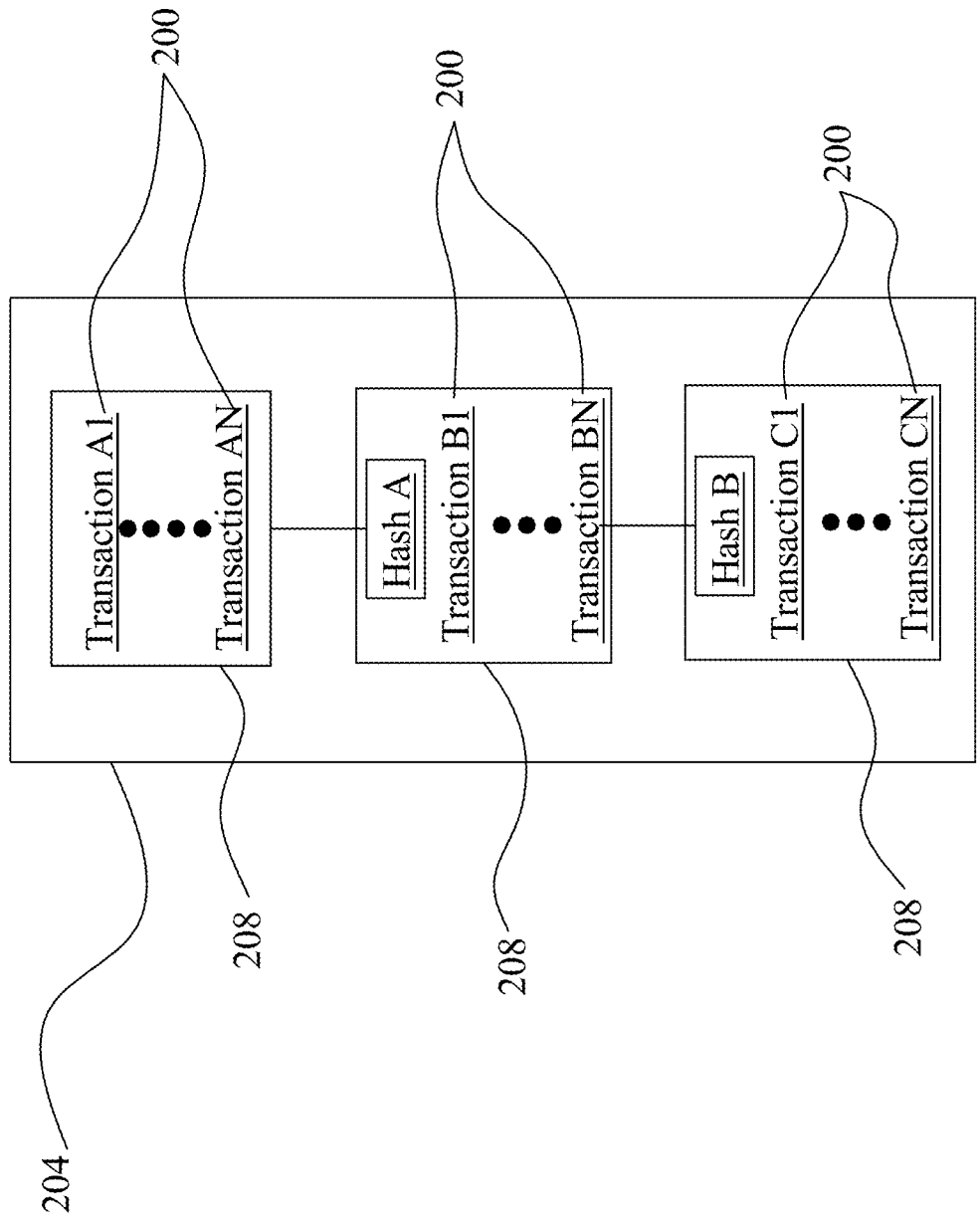
FIG. 2 is a block diagram illustrating an exemplary embodiment of an immutable sequential listing in accordance with one or more embodiments of the present disclosure.

Referring now to FIG. 2, an exemplary embodiment 200 of an immutable sequential listing 124 is illustrated. Data elements are listing in immutable sequential listing 200; data elements may include any form of data, including textual data, image data, encrypted data, cryptographically hashed data, and the like. Data elements may include, without limitation, one or more a digitally-signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory 108 of a processor 104, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of a posted content in a way that preserves the order in which the a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add a posted content to the ledger, but may not allow any users to alter a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any processor 104 may traverse the sub-listings 208 in reverse chronological order to verify any a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only a posted content contained the valid branch as valid a posted content. When a branch is found invalid according to this protocol, a posted content registered in that branch may be recreated in a new sub-listing 208 in the valid branch; the protocol may reject "double spending" a posted content that transfer the same virtual currency that another a posted content in the valid branch has already transferred. As a result, in some embodiments the creation of fraudulent a posted content requires the creation of a longer immutable sequential listing 200 branch by the entity attempting the fraudulent a posted content than the branch being produced by the rest of the participants; as long as the entity creating the fraudulent a posted content is likely the only one with the incentive to create the branch containing the fraudulent a posted content, the computational cost of the creation of that branch may be practically infeasible, guaranteeing the validity of all a posted content in the immutable sequential listing 200.

Still referring to FIG. 2, additional data linked to a posted content may be incorporated in sub-listings 208 in the immutable sequential listing 200; for instance, data may be incorporated in one or more fields recognized by block chain protocols that permit a person or computer forming a posted content to insert additional data in the immutable sequential listing 200. In some embodiments, additional data is incorporated in an unspendable a posted content field. For instance, the data may be incorporated in an OP_RETURN within the BITCOIN block chain. In other embodiments, additional data is incorporated in one signature of a multi-signature a posted content. In an embodiment, a multi-signature a posted content is a posted content to two or more addresses. In some embodiments, the two or more addresses are hashed together to form a single address, which is signed in the digital signature of the a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature a posted content are typical crypto-currency addresses, such as addresses linked to public keys as described above, while one or more additional addresses in the multi-signature a posted content contain additional data related to the a posted content; for instance, the additional data may indicate the purpose of the a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto-currency to the miners. Quantities of crypto-currency may be exchanged using a posted content as described above.

Figure 3:
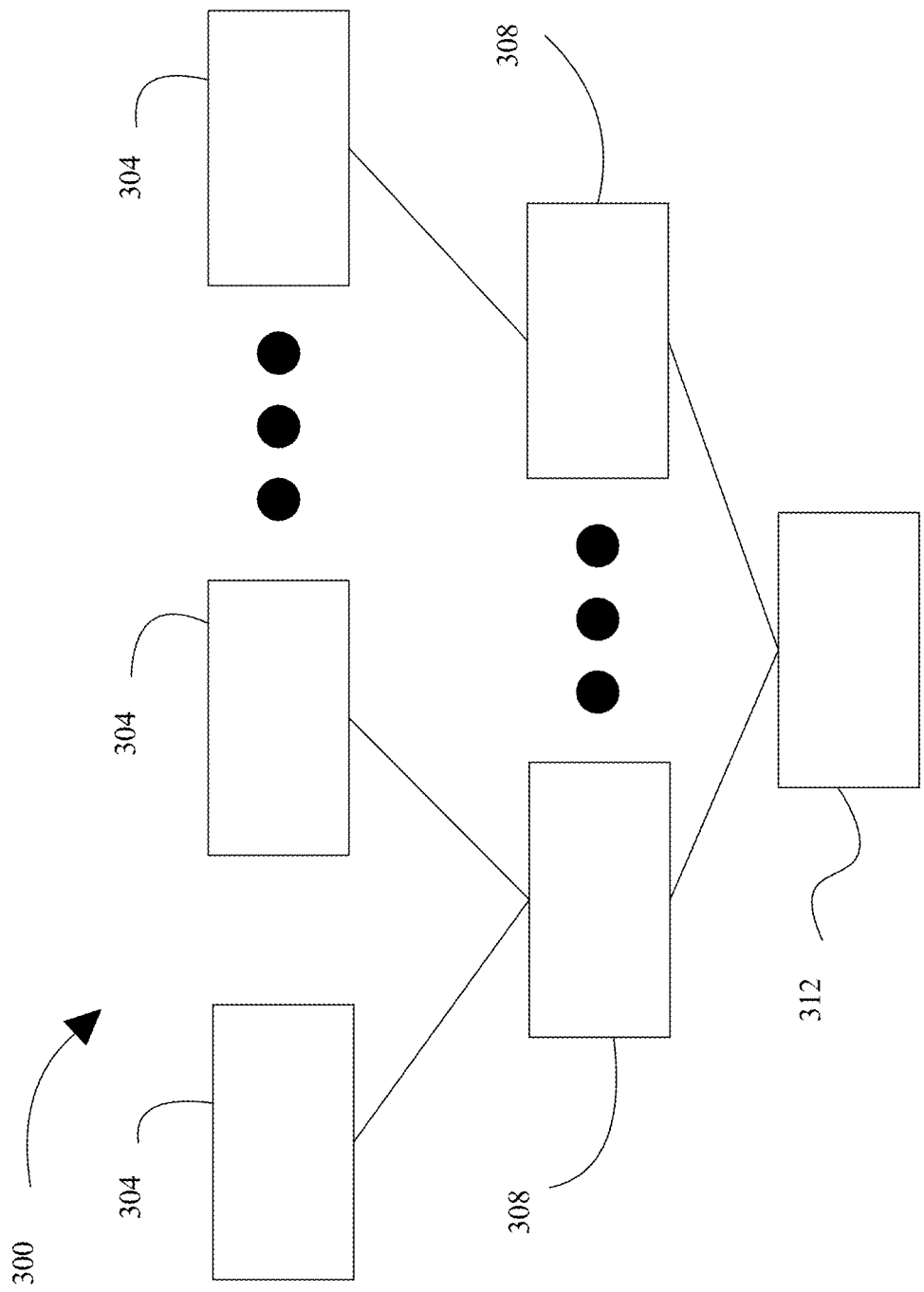
FIG. 3 is a block diagram illustrating an exemplary embodiment of a cryptographic accumulator in accordance with one or more embodiments of the present disclosure.

Turning now to FIG. 3, an exemplary embodiment of a cryptographic accumulator 300 is illustrated. Cryptographic accumulator 300 has accumulated elements 304, each accumulated element 304 generated from a lot of the data lots. Accumulated elements 304 are create using an encryption process, defined for this purpose as a process that renders the lots of data unintelligible from the accumulated elements 304; this may be a one-way process such as a cryptographic hashing process and/or a reversible process such as encryption. Cryptographic accumulator 300 further includes structures and/or processes for conversion of accumulated elements 304 to root 312 element. For instance, and as illustrated for exemplary purposes in FIG. 3, cryptographic accumulator 300 may be implemented as a Merkle tree and/or hash tree, in which each accumulated element 304 created by cryptographically hashing a lot of data. Two or more accumulated elements 304 may be hashed together in a further cryptographic hashing process to produce a node 308 element; node 308 elements may be hashed together to form parent nodes 308, and ultimately a set of nodes 308 may be combined and cryptographically hashed to form root 312. Contents of root 312 may thus be determined by contents of nodes 308 used to generate root 312, and consequently by contents of accumulated elements 304, which are determined by contents of lots used to generate accumulated elements 304. As a result of collision resistance and avalanche effects of hashing algorithms, any change in any lot, accumulated element 304, and/or node 308 is virtually certain to cause a change in root 312; thus, it may be computationally infeasible to modify any element of Merkle and/or hash tree without the modification being detectable as generating a different root 312. In an embodiment, any accumulated element 304 and/or all intervening nodes 308 between accumulated element 304 and root 312 may be made available without revealing anything about a lot of data used to generate accumulated element 304; lot of data may be kept secret and/or demonstrated with a secure proof as described below, preventing any unauthorized party from acquiring data in lot.

Continuing to refer to FIG. 3, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of another secure proof using a device-specific secret. A secure proof may be referred to as a "proof of possession" or "proof of knowledge" of a secret. Where a device-specific secret is secrets, such as challenge-response pairs, a secure proof may include an output that reveals the entirety of one of the secrets, but not all of the secrets; for instance, secure proof may be a response contained in one challenge-response pair. In an embodiment, proof may not be secure; in other words, proof may include a one-time revelation of a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof, for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof Zero-knowledge proof may include, without limitation bulletproofs. Zero-knowledge proof may include a homomorphic public-key cryptography (hPKC)-based proof Zero-knowledge proof may include a discrete logarithmic problem (DLP) proof. Zero-knowledge proof may include a secure multi-party computation (MPC) proof Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Alternatively or additionally, and still referring to FIG. 3, cryptographic accumulator 300 may include a "vector commitment" which may act as an accumulator in which an order of elements in set is preserved in its root 312 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 300 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e. given an input it is easy to produce an output of the one-way function, but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 4:
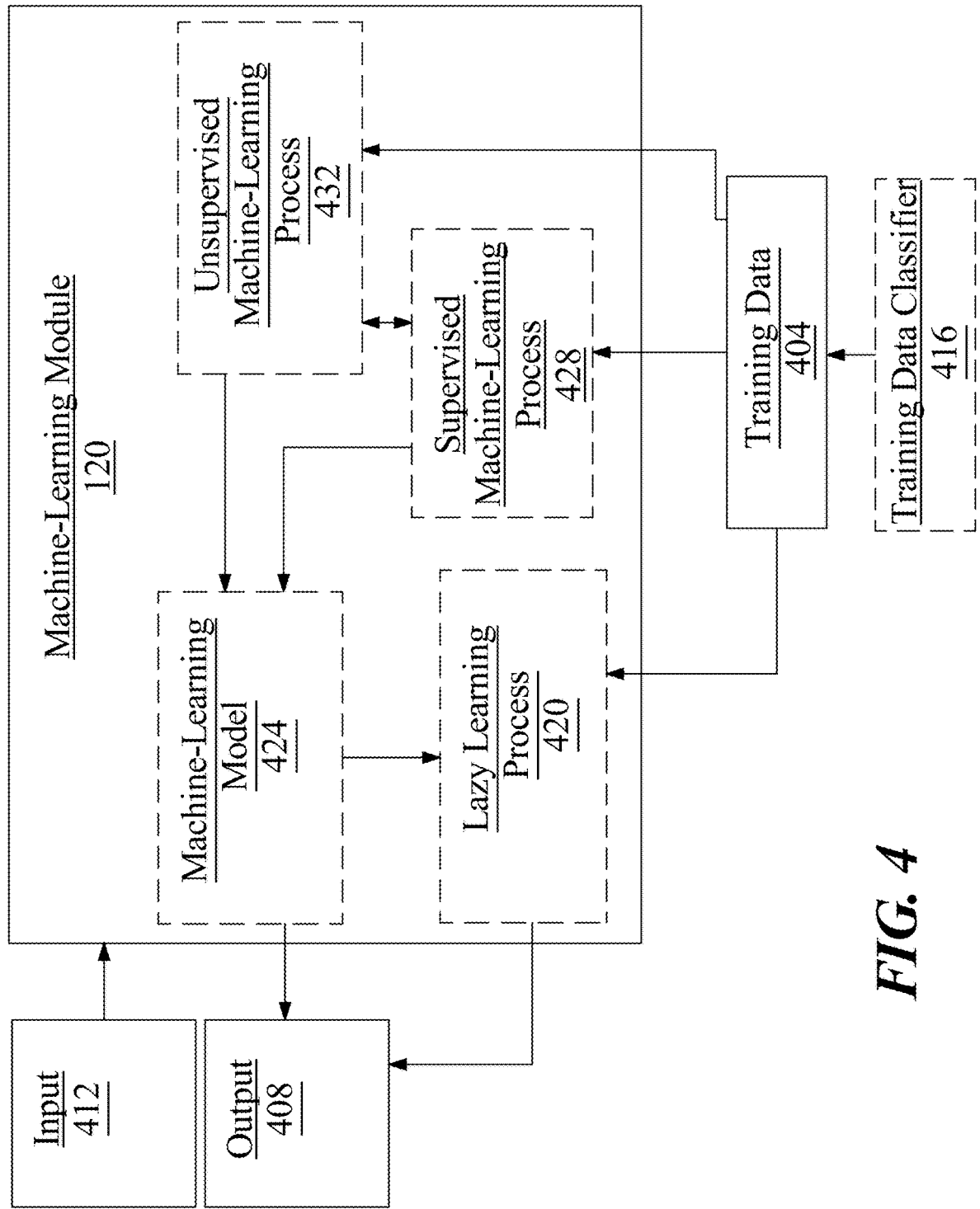
FIG. 4 is a block diagram of exemplary machine-learning processes in accordance with one or more embodiments of the present disclosure.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

In some embodiments, a machine-learning module 400 may be trained as a function of localized training data. That is, a machine-learning module 400 may be trained as a function of training data received from a predetermined radius of sources. For example, 1000 oil wells may span an 10,000 sqkm area. As such, a machine-learning model 400 may be trained as function of oil wells located within the 10,000 sqkm area or any area smaller/larger than that. Further, a specific latitude-longitude coordinate and radius may be selected. Continuing the non-limiting example above, the specific latitude-longitude coordinate and radius may include a fraction of the 1000 oil wells. As such, machine-learning module 400 may be specially trained in view of selected parameters. In some embodiments, a user may compare a specially trained machine learning module 400 to a machine-learning module 400 trained using all oil wells.

Still referring to FIG. 4, "training data," as used herein, is data containing correlations that a machine-learning process may use to model relationships between two or more categories of data elements. For instance, and without limitation, training data 404 may include data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, a user profile may be an input and a predictive quantifier may be an output.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to categories of total cryptographic capital return for which a subset of training data may be selected.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include a supervised machine-learning process 428. a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any input as described above as inputs, any output as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of a supervised machine-learning process 428 that may be used to determine relation between inputs and outputs. Supervised machine-learning processes may include classification algorithms as defined above.

Further referring to FIG. 4, machine learning processes may include an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
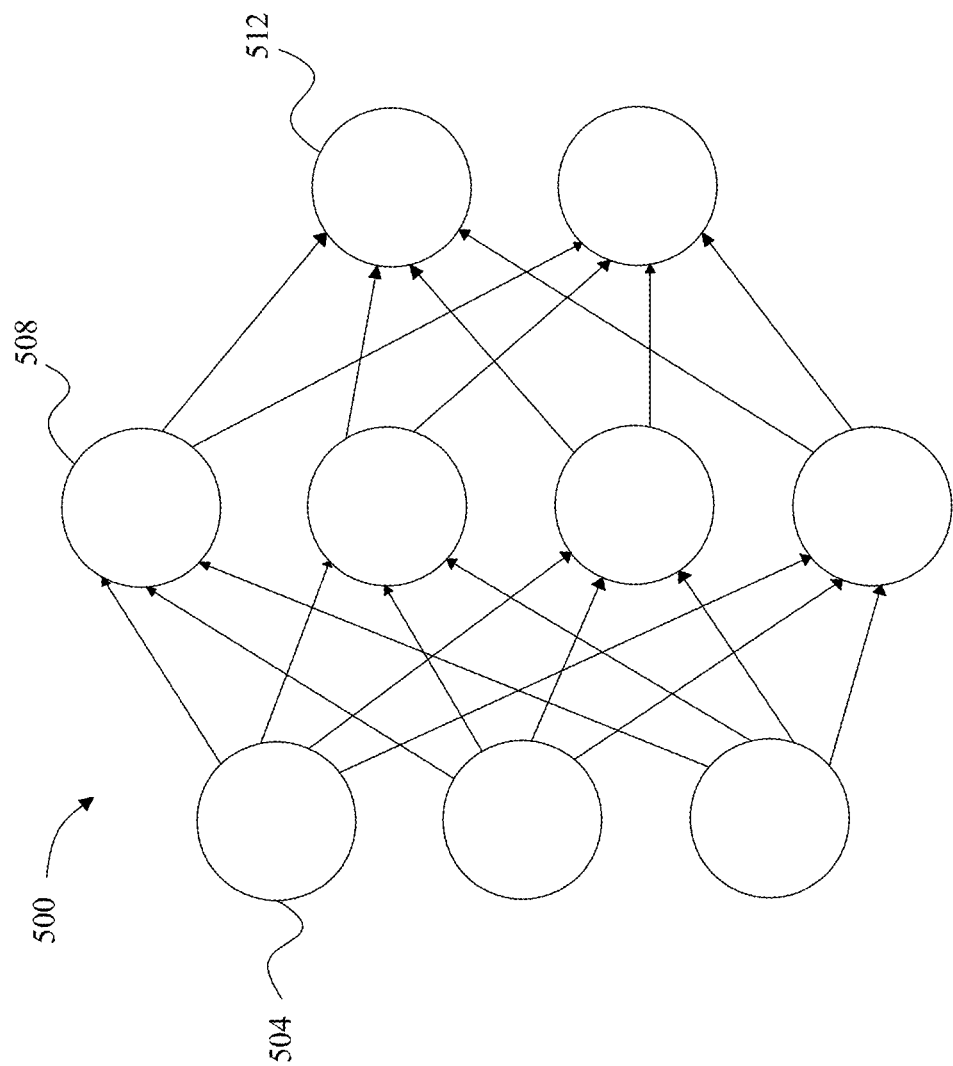
FIG. 5 illustrates an exemplary neural network in accordance with one or more embodiments of the present disclosure.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 6:
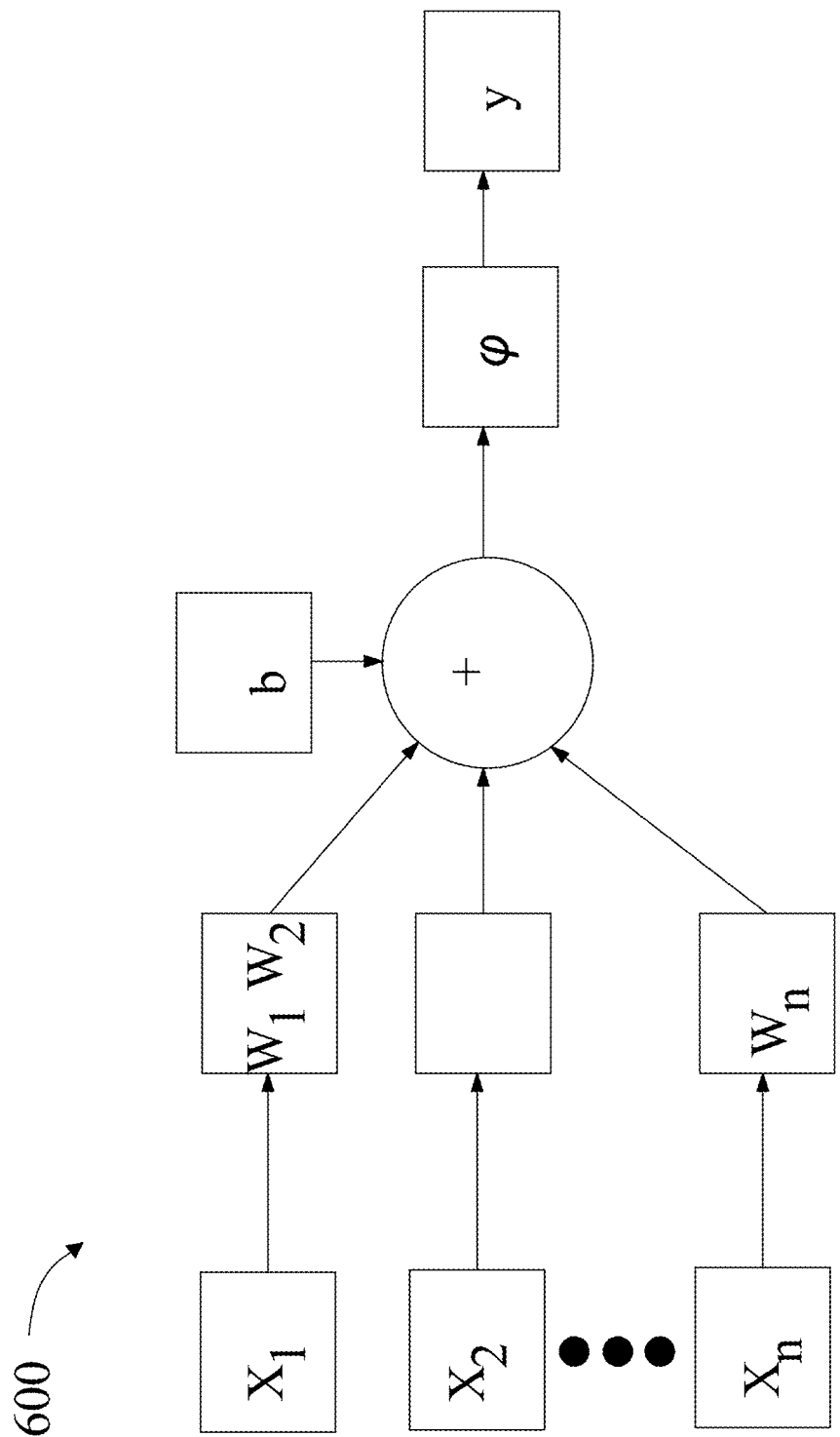
FIG. 6 is a block diagram of an exemplary node in accordance with one or more embodiments of the present disclosure.

Referring now to FIG. 6, an exemplary embodiment of a node of a neural network is illustrated. A node may include, without limitation inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
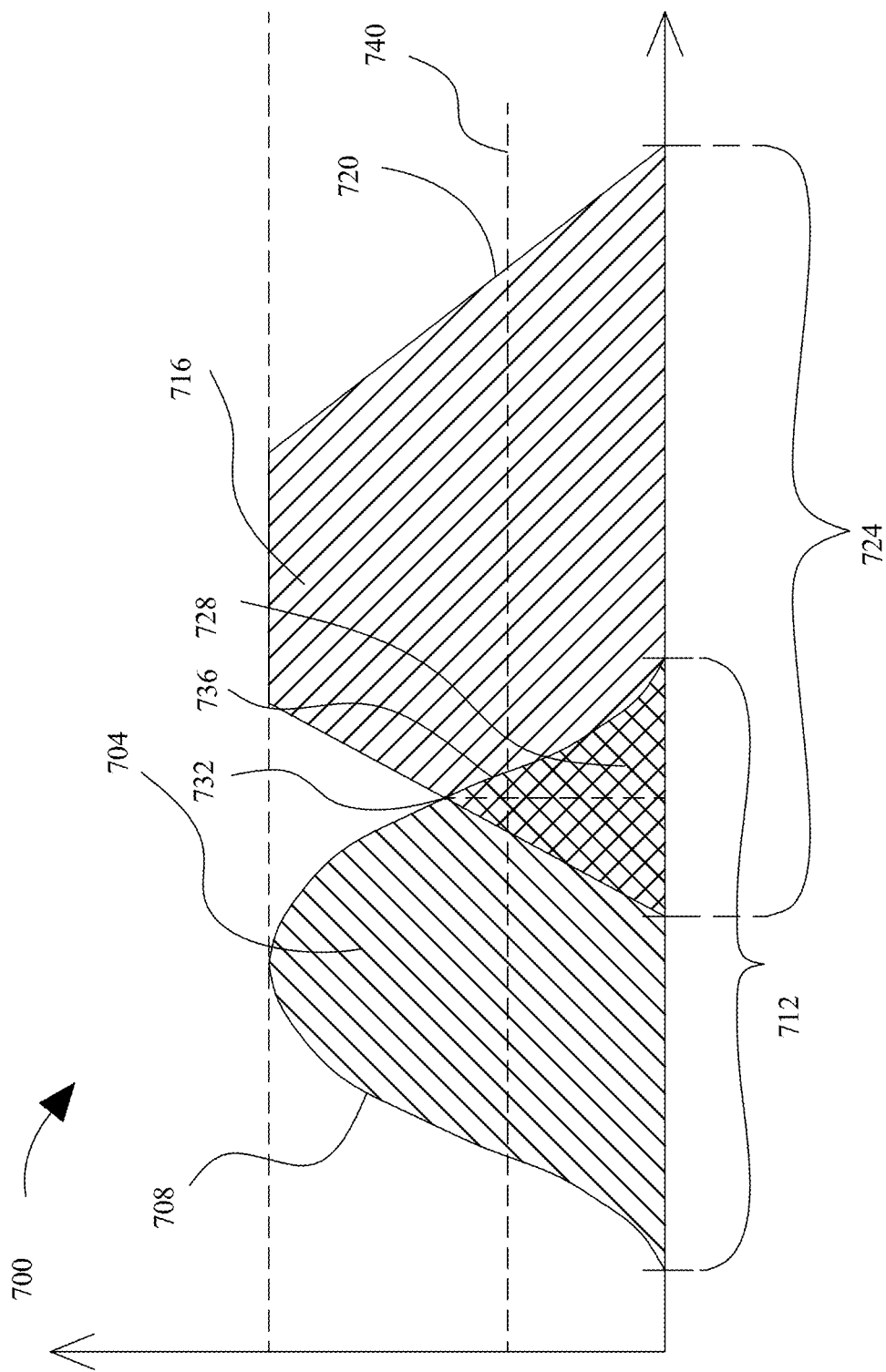
FIG. 7 is a graph illustrating an exemplary relationship between fuzzy sets in accordance with one or more embodiments of the present disclosure.

Referring to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more processes (e.g., machine-learning models), subject-specific data, and description-specific data. A second fuzzy set 716, which may represent any value which may be represented by first fuzzy set 704, may be defined by a second membership function 720 on a second range 724. Second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models and/or subject-specific data and a predetermined class, such as without limitation a job description, for combination to occur as described above. Alternatively or additionally, each threshold may be tuned by a machine-learning and/or statistical process, for instance and without limitation as described in further detail below.

Further referring to FIG. 7, in an embodiment, a degree of match between fuzzy sets may be used to classify data set with, for example, a data well. For instance, if a data set-linked data has a fuzzy set matching a data well fuzzy set by having a degree of overlap exceeding a threshold, computing device may classify the subject as being relevant or otherwise associated with a specific quantification. Where multiple fuzzy matches are performed, degrees of match for each respective fuzzy set may be computed and aggregated through, for instance, addition, averaging, or the like, to determine an overall degree of match.

Still referring to FIG. 7, in an embodiment, data set categories may be compared to multiple class fuzzy sets representing data wells. For instance, category data may be represented by an individual fuzzy set that is compared to each of the multiple class fuzzy sets; and a degree of overlap exceeding a threshold between the individual fuzzy set and any of the multiple class fuzzy sets may cause computing device to classify data set as belonging to a data well. For instance, in one embodiment there may be two class fuzzy sets, representing a first data well and a second data well. First data well may have a first fuzzy set; second data well may have a second fuzzy set; and category data may have an individual fuzzy set. Computing device, for example, may compare an individual fuzzy set with each of first fuzzy set and second fuzzy set, as described above, and classify a category datum to either, both, or neither of first data well nor second data well. Machine-learning methods as described throughout may, in a non-limiting example, generate coefficients used in fuzzy set equations as described above, such as without limitation x, c, and $\sigma$ of a Gaussian set as described above, as outputs of machine-learning methods. Likewise, subject-specific data may be used indirectly to determine a fuzzy set, as the fuzzy set may be derived from outputs of one or more machine-learning models that take the subject-specific data directly or indirectly as inputs. Although an exemplary application for fuzzy set matching is described above, fuzzy set matching may be used for any classifications or associations described within this disclosure.

Figure 8:
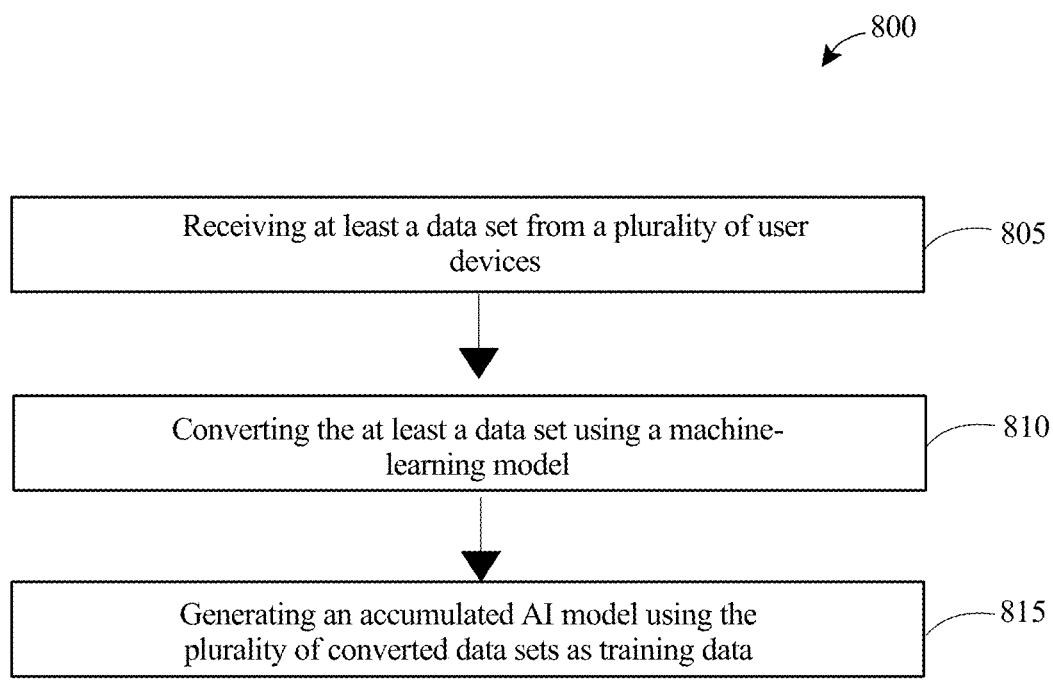
FIG. 8 is an exemplary embodiment of a method for generating open-source models using artificial intelligence in accordance with one or more embodiments of the present disclosure.

Referring now to FIG. 8, an exemplary embodiment of method 800 of generating a compiled artificial intelligence (AI) model is shown. Step 805 of method 800 includes receiving receive a data set from user devices. The a data set may include a first data set and the like. This may be implemented, without limitation, as described above in reference to FIGS. 1-7.

Still referring to FIG. 8, step 810 of method 800 includes converting the data sets using a machine-learning model into a cleansed data format. The converting of the data sets may include parsing each data set of the data sets and each header of headers of the data sets into parsed data. This may be implemented, without limitation, as described above in reference to FIGS. 1-7. The converting of the a data set may include compiling each data set of the data sets into a cumulative data set, wherein the cumulative data set may include canonical categories of data. This may be implemented, without limitation, as described above in reference to FIGS. 1-7. The compiling each data set of the a data set into a cumulative data set may include classifying the parsed data from the a data set into the canonical categories of data, as described above in reference to FIGS. 1-7. The compiling each data set of the a data set into a cumulative data set may include inputting the parsed data into the canonical categories of data based on the categorization of the parsed data, as described above in reference to FIGS. 1-7.

Step 815 of method 800 includes generating an accumulated model using the converted data sets as training data. This may be implemented, without limitation, as described above in reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
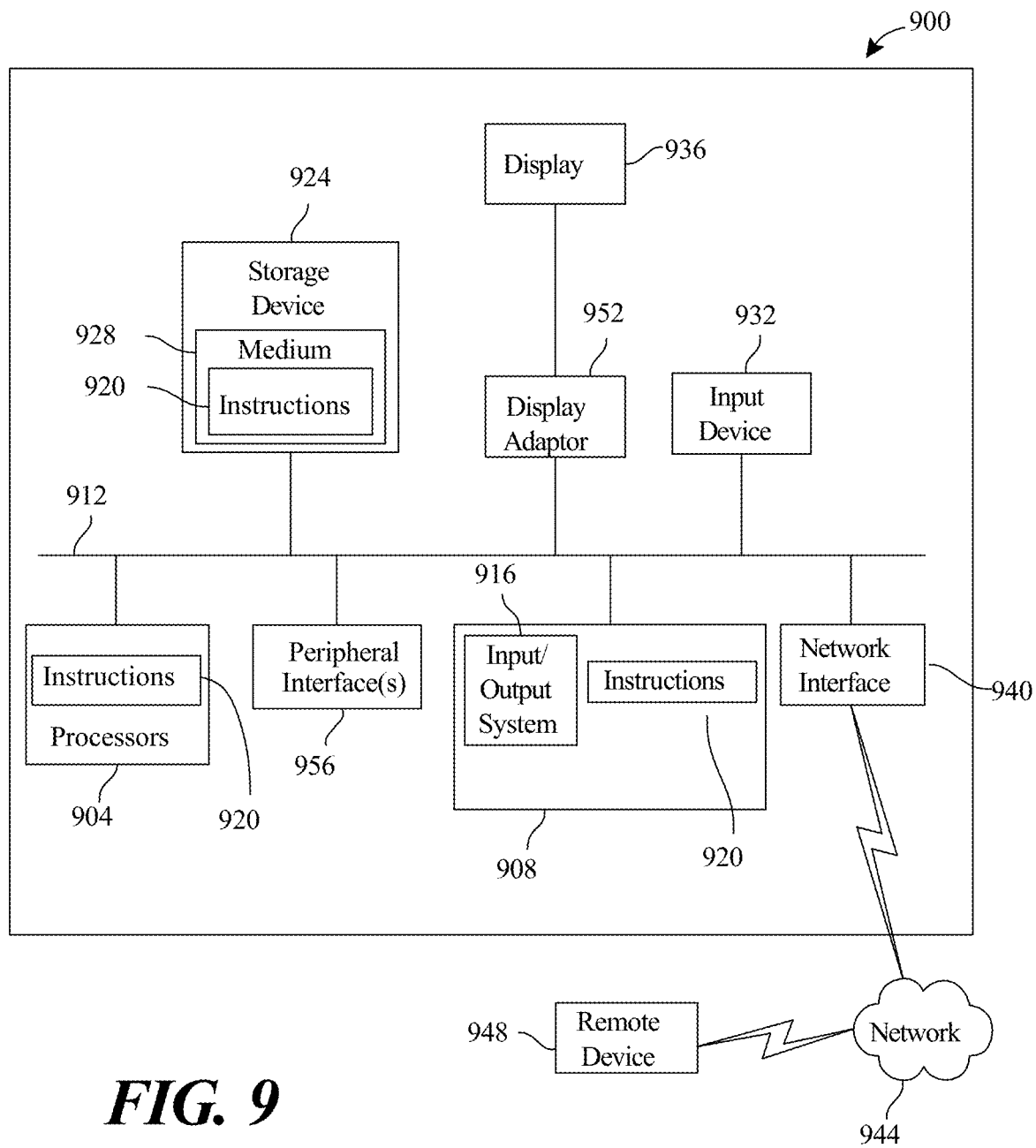
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a compiled artificial intelligence (AI) model the apparatus comprising:
   a processor; and
   a memory communicatively coupled to the processor, the memory containing instructions configuring the processor to:
      receive a plurality of data sets, wherein:
         each data set of the plurality of data sets has a corresponding source; and
         receiving each data set includes receiving the data set from a user device of a plurality of user devices, wherein the received data set comprises meta data describing a data bucket associated with the received data set;
      generate, for each data set of the plurality of data sets, a serial identifier, wherein the serial identifier comprises entries that are verified on an immutable sequential listing, wherein the immutable sequential listing further verifies the corresponding source of each data set of the plurality of data sets which is used to generate an accumulated model;
      generate a smart contract associated with the plurality of data sets, wherein:
         generating the smart contract further comprises generating the smart contract as a function of each serial identifier and each user device of the plurality of user devices and wherein_the smart contract is configured to validate each user device as a function of the serial identifier; and
         the smart contract is configured to make a payment as a function of a conditional trigger;
      convert each data set of the plurality of data sets using a machine-learning model into a cleansed data format, wherein:
         the conversion comprises:
            parsing each data set of the plurality of data sets;
            correcting the parsed data set, wherein correcting the parsed data set further comprises:

determining a selected unit of measurement for the parsed data based on an initial unit of measurement of the parsed data; and calculating an adjusted value of the parsed data set as a function of the selected unit of measurement;

relabeling the parsed data set standardizing each data set of the plurality of data sets; and the cleansed data format comprises a plurality of converted data sets; and generate the accumulated model as a function of real time data received from a data well using the plurality of converted data sets as training data and the serial identifier, wherein the conditional trigger is configured to determine that the accumulated model is using a data set of the plurality of converted data sets and to make a payment to the corresponding source of a data set of the plurality of converted data sets as a function of the determination.

2. The apparatus of claim 1, wherein each data set of the plurality of data sets comprises:

a first data set; and a second data set distinct from the first data set.

3. The apparatus of claim 1, wherein the converting of each data set of the plurality of data sets comprises:

parsing each data set of the plurality of data sets and each header of headers of each data set of the plurality of data sets into parsed data; and compiling each data set of the plurality of data sets into a cumulative data set, wherein the cumulative data set includes canonical categories of data, wherein the compiling of each data set comprises:

classifying the parsed data from each data set of the plurality of data sets into the canonical categories of data; and inputting the parsed data into the canonical categories of data based on the categorization of the parsed data.

4. The apparatus of claim 3, wherein the processor is further configured to input the parsed data from a data set into a data set template with canonical headers based on the classification of the parsed data.

5. The apparatus of claim 4, wherein the processor is further configured to:

generate the data set template using a template machine-learning model; and modify the data set template using the template machine-learning model.

6. The apparatus of claim 1, wherein the converting of each data set of the plurality of data sets comprises:

training a data category classifier using a data category training set, wherein the machine learning model is configured to classify a data bucket for each data set of the plurality of data sets based on data within each respective data set.

7. The apparatus of claim 1, wherein a plurality of serial identifiers include entries to be verified using an immutable sequential listing.

8. The apparatus of claim 1, wherein the generating of the accumulated model comprises generating the accumulated model using artificial intelligence (AI).

9. The apparatus of claim 8, wherein the generating the accumulated model based on the plurality of converted data sets comprises:

verifying the plurality of converted data sets to entries in an immutable sequential listing as a function of a Merkle Proof; and generating the accumulated model using the verified the plurality of converted data sets.

10. A method for generating a compiled artificial intelligence (AI) model, the method comprising:

receiving, by a processor, a plurality of data sets, wherein:

each data set of the plurality of data sets has a corresponding source; and receiving each data set includes receiving the data set from a user device of a plurality of user devices, wherein the received data set comprises meta data describing a data bucket associated with the received data set;

generating, by the processor, for each data set of the plurality of data sets, a serial identifier, wherein the serial identifier comprises entries that are verified on an immutable sequential listing, wherein the immutable sequential listing further verifies the corresponding source of each data set of the plurality of data sets which is used to generate an accumulated model;

generating, by the processor, a smart contract associated with the plurality of data sets, wherein:

generating the smart contract further comprises generating the smart contract as a function of each serial identifier and each user device of the plurality of user devices;

the smart contract is configured to validate each user device as a function of the serial identifier and wherein_the smart contract is configured to make a payment as a function of a conditional trigger;

converting, by the processor, each data set of the plurality of data sets using a machine-learning model into a cleansed data format, wherein:

the conversion comprises:

parsing each data set of the plurality of data sets;

correcting the parsed data set, wherein correcting the parsed data set further comprises:

determining a selected unit of measurement for the parsed data based on an initial unit of measurement of the parsed data;

calculating an adjusted value of the parsed data set as a function of the selected unit of measurement; and relabeling the parsed data set;

standardizing each data set of the plurality of data sets; and the cleansed data format comprises a plurality of converted data sets; and generating, by the processor, accumulated model as a function of real time data received from a data well using the plurality of converted data sets as training data and the serial identifier, wherein the conditional trigger is configured to determine that the accumulated model is using a data set of the plurality of converted data sets and to make a payment to the corresponding source of a data set of the plurality of converted data sets as a function of the determination.

11. The method of claim 10, wherein each data set of the plurality of data sets comprises:

a first data set; and a second data set distinct from the first data set.

12. The method of claim 10, wherein the converting of each data set of the plurality of data sets comprises:

parsing each data set of the plurality of data sets and each header of headers of each data set of the plurality of data sets into parsed data; and compiling each data set of the plurality of data sets into a cumulative data set, wherein the cumulative data set includes canonical categories of data, wherein the converting of each data set comprises:

classifying the parsed data from each data set of the plurality of data sets into the canonical categories of data; and inputting the parsed data into the canonical categories of data based on the categorization of the parsed data.

13. The method of claim 12, wherein the processor is further configured to input the parsed data from the data set into a data set template with canonical headers based on the classification of the parsed data.

14. The method of claim 13, further comprising:

generating, by the processor, the data set template using a template machine-learning model; and modifying, by the processor, the data set template using the template machine-learning model.

15. The method of claim 10, wherein the converting of each data set of the plurality of data sets comprises:

generating a data category classifier; and training the data category classifier using a data category training set, wherein the machine learning model is configured to classify each data set of the plurality of data sets to a data bucket based on data within each respective data set.

16. The method of claim 10, wherein a plurality of serial identifiers include entries to be verified using an immutable sequential listing.

17. The method of claim 10, wherein the generating of the accumulated model comprises generating the accumulated model using artificial intelligence (AI).

18. The method of claim 17, wherein the generating the accumulated model based on the plurality of converted data sets comprises:

verifying the plurality of converted data sets to entries in an immutable sequential listing as a function of a Merkle Proof; and generating the accumulated model using the verified the plurality of converted data sets.

\* \* \* \* \*